(12) United States Patent
Nakano

(10) Patent No.: US 6,502,907 B2
(45) Date of Patent: Jan. 7, 2003

(54) METHOD OF CONTROLLING HYDRAULIC BRAKE SYSTEM FOR VEHICLE

(75) Inventor: Keita Nakano, Itami (JP)

(73) Assignee: Sumitomo (SEI) Brake Systems, Inc., Mie (JP)

( * ) Notice: Subject to any disclaimer, the term of this patent is extended or adjusted under 35 U.S.C. 154(b) by 0 days.

(21) Appl. No.: 09/811,520

(22) Filed: Mar. 20, 2001

(65) Prior Publication Data

US 2001/0026097 A1 Oct. 4, 2001

(30) Foreign Application Priority Data

Mar. 30, 2000 (JP) ........................................ 2000-093215

(51) Int. Cl.[7] ............................................... B60T 8/00
(52) U.S. Cl. ..................................... 303/155; 303/113.4
(58) Field of Search .............................. 303/10, 11, 155, 303/113.4, DIG. 3, DIG. 4, 116.1, 116.2

(56) References Cited

U.S. PATENT DOCUMENTS

| 5,228,289 | A | * | 7/1993 | Norton ......................... 303/10 |
| 5,332,298 | A | | 7/1994 | Fujioka |
| 5,511,862 | A | | 4/1996 | Fujioka |
| 6,183,050 | B1 | * | 2/2001 | Ganzel ..................... 303/114.1 |
| 6,226,586 | B1 | * | 5/2001 | Luckevich et al. ......... 303/155 |

FOREIGN PATENT DOCUMENTS

JP          2590825          12/1996

* cited by examiner

*Primary Examiner*—Matthew C. Graham
(74) *Attorney, Agent, or Firm*—Greenblum & Bernstein, P.L.C.

(57) ABSTRACT

A method of controlling a hydraulic pressure source-drive type vehicle hydraulic brake system which would not make the driver feel a delay in the effect of braking, and in which the braking force acts quickly and reliably even during urgent braking. A stroke sensor for detecting the pedal depressed amount in the initial play area is provided. By activating a motor for a pump for supplying brake fluid to a wheel cylinder beforehand when the stroke sensor detects that the pedal depressed amount has reached a predetermined threshold, the time needed to depress the brake pedal to the terminal position of the initial play area and the delay time in response of the actuation of the motor are overlapped to shorten the time from the start of depressing of the brake pedal to the actuation of the brake.

20 Claims, 4 Drawing Sheets

METHOD OF CONTROLLING HYDRAULIC BRAKE SYSTEM FOR VEHICLE

BACKGROUND OF THE INVENTION

This invention relates to a method of controlling a hydraulic brake system for a vehicle provided with a hydraulic pressure source for generating brake hydraulic pressure.

In recent years, in order to achieve sophisticated behavior control of a vehicle and a light brake feeling, as disclosed e.g. in Japanese patent publication 2590825, a brake system is employed which is provided with a hydraulic pressure source for generating brake hydraulic pressure and actuates a driving device for the hydraulic pressure source based on a detection signal from a brake operating force detecting means for detecting the operating force applied to a brake operating member.

Among brake systems of such a hydraulic pressure source-driven type, there is one having a fail-safe function which has a master cylinder for producing hydraulic pressure corresponding to the operating force applied to the brake operating member, the master cylinder communicating with wheel cylinders through master cylinder passages having on-off valves, and opens the on-off valves to transmit the hydraulic pressure of the master cylinder as brake hydraulic pressure if the hydraulic pressure source does not operate normally.

In a brake system of such a conventional hydraulic pressure source-driven type, since there is a delay in response between the detection of the operating force by the brake operating force detecting means and the activation of the hydraulic pressure source for producing brake hydraulic pressure, compared with a conventional master cylinder-direct-connect type, rise in the brake hydraulic pressure is slow, so that the driver feels some delay in the brake effect.

Also, a brake control member such as a brake pedal usually has an initial play area in its operating amount. Thus, in a hydraulic pressure source-driven type brake system as described above, a time from the start of brake operation to actuation is equal to the sum of the time needed to depress the pedal for the initial play area and the abovementioned delay in response. Thus it is possible that the effect of the brake does not appear in time especially during urgent braking.

An object of this invention is to provide a method of controlling a hydraulic pressure source-driven type vehicle hydraulic brake system with which the driver does not feel a delay in the effect of braking, and in which the braking force operates quickly and reliably even during urgent braking.

SUMMARY OF THE INVENTION

According to this invention, there is provided a method of controlling a vehicle hydraulic brake system the brake system has a brake operating member having an initial play area, a brake operating force detecting means for detecting an operating force of the brake operating member produced when the brake operating amount of the brake operating member exceeds the initial play area, a hydraulic pressure source for producing brake hydraulic pressure in a wheel cylinder, a driving device for the hydraulic pressure source, a fluid passage for communicating the hydraulic pressure source with the wheel cylinder, and a relief passage communicating with the wheel cylinder through an on-off valve, and the driving device for the hydraulic pressure source being actuated based on a detection signal from the brake operating force detecting means, characterized in that a brake operating amount detecting means for detecting the brake operating amount in the initial play area is provided, a threshold is set at a predetermined position in the initial play area, and that the driving device for the hydraulic pressure source is actuated beforehand when the brake operating amount detecting means detects that the brake operating amount has reached the threshold.

That is, the brake operating amount detecting means for detecting the brake depressed amount in the initial play area of the brake operating member is provided, and by activating the device for driving the hydraulic pressure source beforehand when the brake operating amount detecting means detects that the brake operating amount has reached a predetermined threshold, the time needed for the brake depressed amount in the initial play area and the response delay of the device for driving the hydraulic pressure source are overlapped to shorten the time from the start of brake operation to the actuation of the brake.

This method of controlling a vehicle hydraulic brake system can be used to a brake system which further comprises a master cylinder for producing hydraulic pressure corresponding to the operating force of the brake operating member, and a master cylinder passage through which the master cylinder and the wheel cylinder communicate with each other through an on-off valve, and wherein the hydraulic pressure produced in the master cylinder is transmitted to the wheel cylinder by selectively opening and closing the on-off valve in the master cylinder passage.

In the method of controlling a vehicle hydraulic brake system, the on-off valve in said relief passage is opened beforehand, and is closed when the brake operating amount detecting means or the brake operating force detecting means detects that the brake operating amount has reached the terminal position of the initial play area. Thus it is possible to shorten the time from the start of brake operation to the actuation of the brake while ensuring the play function of the brake operating member.

In the brake system having the master cylinder passage, when the device for driving the hydraulic pressure source is activated beforehand, the on-off valve in the master cylinder passage may be opened beforehand, and closed when the brake operating amount detecting means or the brake operating force detecting means detects that the brake operating amount has reached the terminal position of the initial play area.

By detecting the operating speed of the brake operating member in the initial play area by the brake operating amount detecting means, and increasing the driving force of the driving device for the hydraulic pressure source which is activated beforehand according to the operating speed, it is possible to increase the rising speed of the brake hydraulic pressure depending upon the degree of urgency of the brake, which corresponds to the operating speed of the brake operating member and thus to make the magnitude of the braking force and the brake working speed more suitable. When the operating speed of the brake operating member is slow because no urgency is needed, the driving force by the driving device can be decreased to minimize energy loss.

Other features and objects of the present invention will become apparent from the following description made with reference to the accompanying drawings, in which:

DETAILED DESCRIPTION OF THE PREFERRED EMBODIMENT

Figure 1:
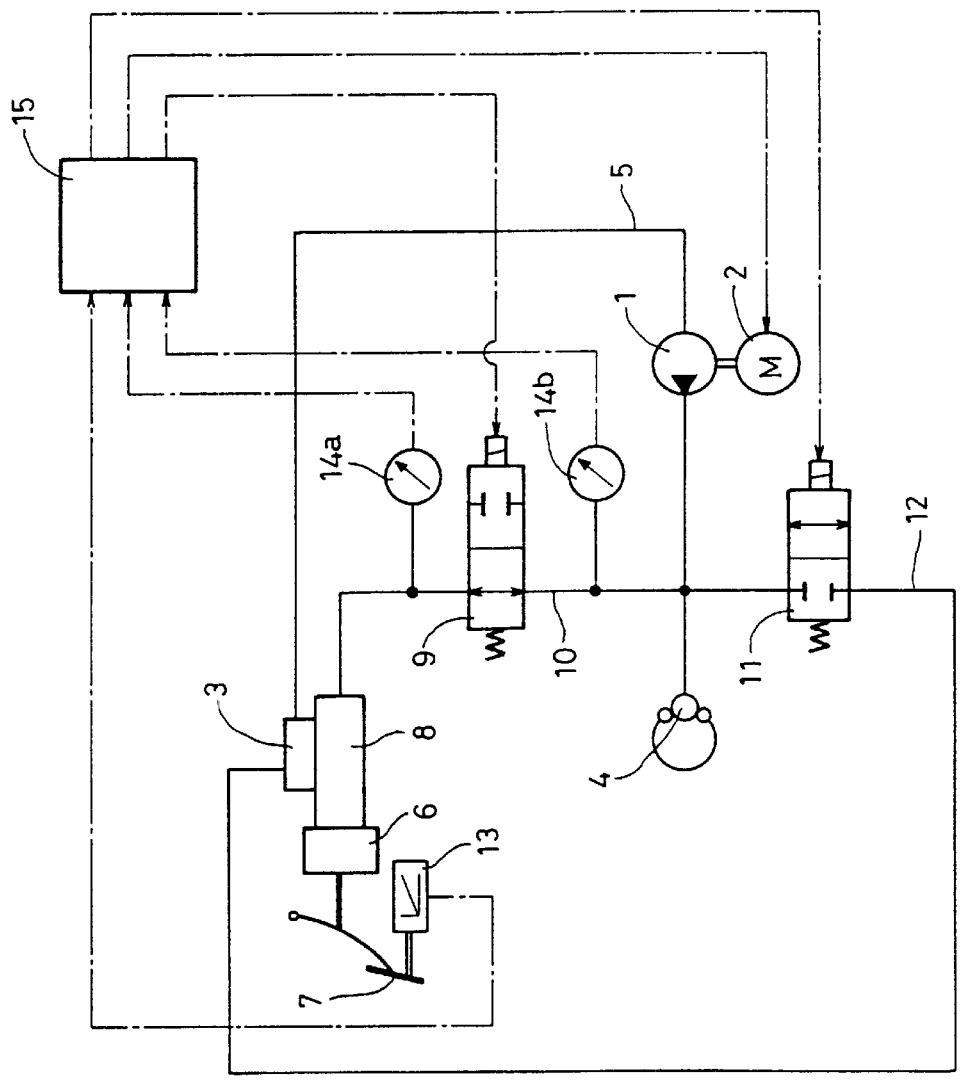
FIG. 1 is a circuit diagram showing a brake system to which a control method of a first embodiment is applied.

Hereinbelow, with reference to the drawings, the embodiments of this invention will be described. FIG. 1 shows a vehicle hydraulic brake system to which the control method of the first embodiment is applied. This brake system includes a pump 1 as a hydraulic pressure source and a motor 2 as its driving device.

The pump 1 is provided in a fluid passage 5 which communicates a reservoir tank 3 with a wheel cylinder 4. A master cylinder 8, to which is coupled a brake pedal 7 as a brake operating member through a booster 6, communicates with the wheel cylinder 4 through a solenoid valve 9, which is an on-off valve, by way of a master cylinder passage 10. Between the wheel cylinder 4 and the reservoir tank 3, a relief passage 12 for brake fluid is provided in which is mounted a solenoid valve 11.

To the brake pedal 7, a stroke sensor 13 for detecting the pedal depressed amount is mounted. In the master cylinder passage 10, pressure sensors 14a, 14b for detecting the hydraulic pressure in the master cylinder 8 and the brake hydraulic pressure in the wheel cylinder 4, respectively, are mounted. The detection signals from these sensors 13, 14a, 14b are put into a controller 15, and the actuations of the motor 2 and the solenoid valves 9 and 11 are controlled by the controller 15 based on these detection signals.

Hereinbelow, it will be described how the brake system is controlled by the controller 15. In a normal state, the controller 15 supplies brake fluid in the reservoir tank 3 to the wheel cylinder 4 by means of the pump 1 to generate a brake hydraulic pressure by closing the solenoid valve 9 to shut off the master cylinder 8 from the wheel cylinder 4 and activating the motor 2 upon detection of the depressing of the brake pedal 7 in the manner described below.

If brake fluid supplied by the pump 1 is insufficient for some reason and the controller 15 judges that the brake hydraulic pressure detected by the pressure sensor 14b is insufficient, it will open the solenoid valve 9 in the master cylinder passage 10 to transmit the hydraulic pressure in the master cylinder 8 to the wheel cylinder 4 to generate a sufficient brake hydraulic pressure.

In either of the above cases, when the controller 15 detects the release of the brake pedal 7, it will open the solenoid valve 11 in the relief passage 12 to release the braking force and return the brake fluid supplied to the wheel cylinder 4 to the reservoir tank 3.

Next, it will be described how controlled during depressing of the brake pedal 7 in the normal state. In the controller 15, a threshold $S_T$ for a predetermined position in the initial play area of the depressed amount S of the brake pedal 7 is preset. When the depressed amount S detected by the stroke sensor 13 reaches the threshold $S_T$, the controller 15 will activate the motor 2 to drive the pump 1. Further, the controller 15 detects the pedal depressing speed from change in the detection signal of the stroke sensor 13, and commands to increase the driving force W of the motor 2 for driving the pump 1 according to the magnitude of the pedal depressing speed.

Also, in the controller 15, the terminal position $S_F$ of the initial play area of the pedal depressed amount S is stored. When the depressed amount S reaches the initial play area terminal position $S_F$, the controller 15 closes the solenoid valve 11. Thus, as soon as the initial play area ends, brake fluid will be supplied from the pump 1, which has been activated beforehand, to the wheel cylinder 4, so that the brake hydraulic pressure $P_W$ in the wheel cylinder rises.

When the pedal depressed amount S exceeds the initial play area, as with conventional brake systems, the controller 15 detects the hydraulic pressure $P_M$ in the master cylinder 8, which increases corresponding to the pedal depressing force, by means of the pressure sensor 14a, and increases or decreases the motor driving force W based on the detection signal of the pressure sensor 14a.

Example

Figure 2:
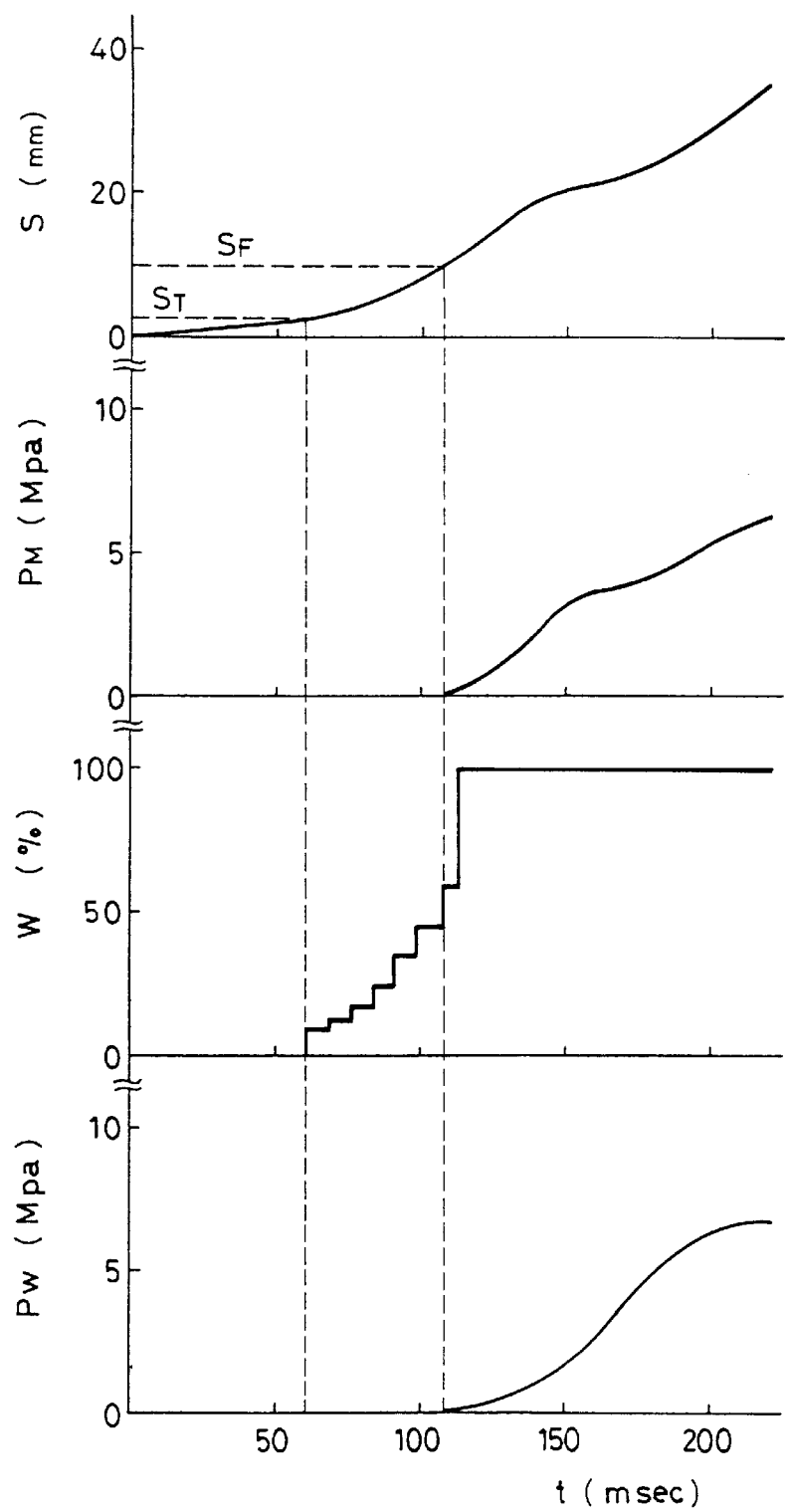
FIG. 2 is a graph showing the control results for Example of the brake system of FIG. 1.

With the brake system shown in FIG. 1, the brake pedal 7 was depressed and control was conducted by the above control method. The control results are shown in the graph of FIG. 2.

The graph shows, with time t from the start of depressing of the brake pedal 7 as abscissa, the depressed amount S detected by the stroke sensor 13 and fluid pressure $P_M$ of the master cylinder 8 detected by the pressure sensor 14a, which are input signals for control, and the motor driving force W which are output signals of control and brake hydraulic pressure $P_W$ in the wheel cylinder 4, as a control result.

First, when the depressed amount S reaches the predetermined threshold $S_T$, the motor 2 is activated and motor driving force W is generated. The driving force W increases with increase in the depressed amount S, and thus the depressing speed. Since the solenoid valve 11 in the relief passage 12 is open, brake hydraulic pressure PW has not yet been produced.

When the depressed amount S reaches the initial play area terminal position SF, the solenoid valve 11 is closed, so that brake hydraulic pressure PW is immediately produced. At the same time when the initial play area of the pedal depressing ends, hydraulic pressure PM in the master cylinder 8 is produced. According to the magnitude of the fluid pressure PM, the motor driving force W increases sharply, and thus the brake hydraulic pressure PW increases. Instead of opening the solenoid valve 11 in the relief passage 12, the solenoid valve 9 in the master cylinder passage 10 may be kept open and it may be closed when the depressed amount S reaches the initial play interval terminal position SF.

Comparative Example

Figure 3:
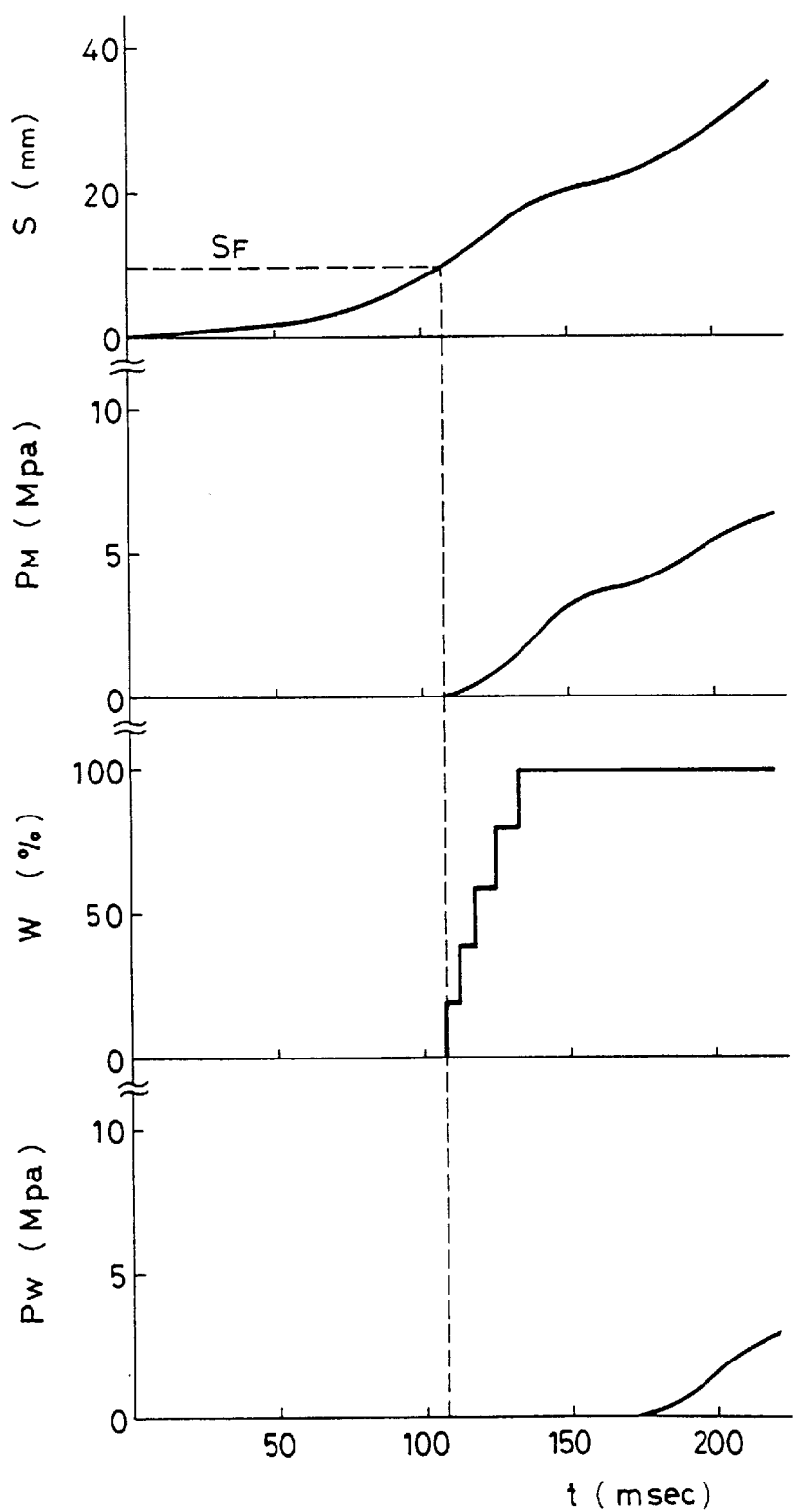
FIG. 3 is a graph showing the control results for Comparative Example of the brake system of FIG. 1.

Using the same brake system as shown in FIG. 1, as with conventional control method, with only the detection signal of hydraulic pressure PM in the master cylinder 8 as an input signal of control, control during depressing of the brake pedal 7 was conducted. The detection signal from the stroke sensor 13 was used merely for measurement of the pedal depressed amount and not as an input signal of control. The control results are shown in the graph of FIG. 3. The way the graph is indicated is the same as FIG. 2.

In this control, the motor 2 is activated and the motor driving force W increases with increase in the hydraulic pressure PM only after the pedal depressed amount S has reached the initial play interval terminal position S and hydraulic pressure PM in the master cylinder 8 has been produced. Although the solenoid valve 11 is closed simultaneously with the activation of the motor 2, brake pressure PW is produced not immediately but rises only after about 60 microseconds due to the abovementioned response delay.

As will be apparent from the comparison of these control results, in Comparative Example, after the depressing of the brake pedal 7 for the initial play area, brake hydraulic pressure PW is produced after further delay. In contrast, in Example, as with conventional master cylinder-direct-connect type brake systems, simultaneously with the end of the initial play area, brake hydraulic pressure PW is produced. Thus, the driver never feels a delay in the effect of the brake. Also, during urgent braking, it is possible to produce the braking force quickly and reliably with the depressing of the brake pedal 7.

Figure 4:
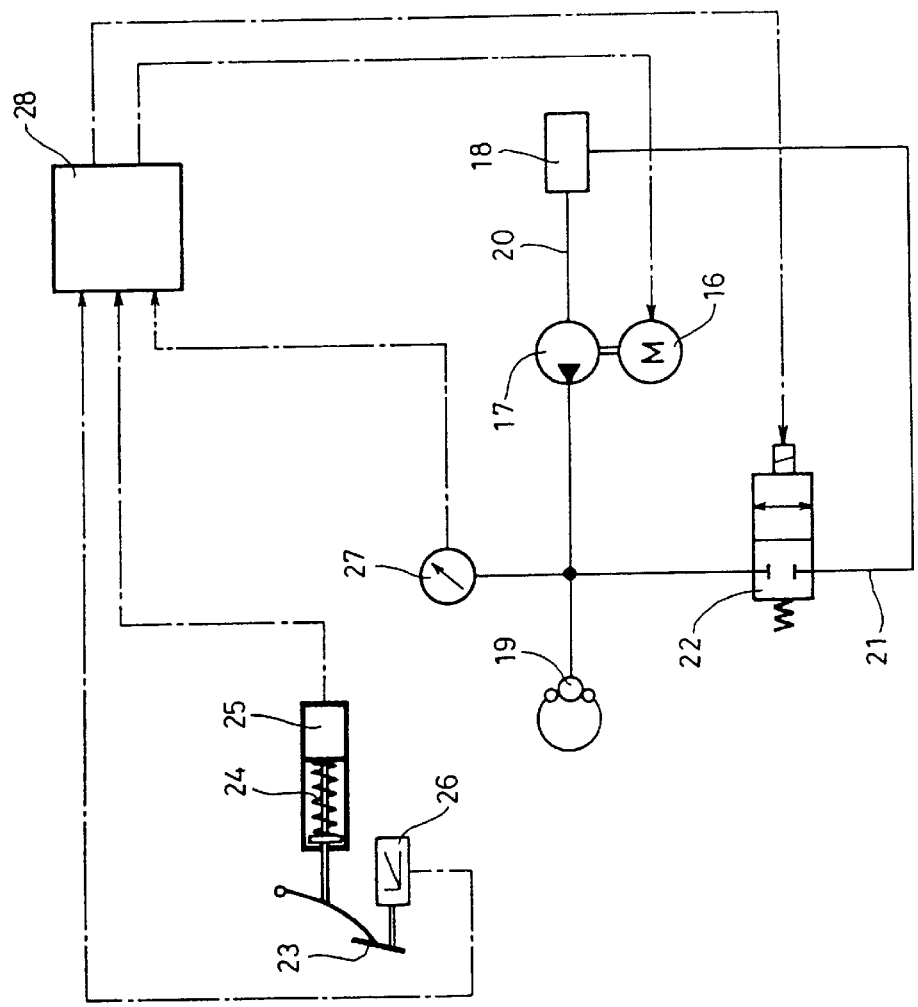
FIG. 4 is a circuit diagram showing a brake system to which a control method of a second embodiment is applied.

FIG. 4 shows a vehicle hydraulic brake system in which the control method of the second embodiment is applied. With this brake system, a pump 17 as a hydraulic pressure source, which is driven by a motor 16, is provided in a brake fluid passage 20 through which a reservoir tank 18 and a wheel cylinder 19 communicate with each other, and a solenoid valve 22 is provided in a relief passage 21 for returning brake fluid from the wheel cylinder 19 to the reservoir tank 18. The brake hydraulic pressure is produced only with the pump 17.

To a brake pedal 23 as a brake operating member, a spring 24 for producing its depressing force is coupled, and a load sensor 25 for detecting the depressing force and a stroke sensor 26 for detecting the pedal depressed amount are mounted. In the fluid passage 20, a pressure sensor 27 for detecting the brake hydraulic pressure in the wheel cylinder 19 is also mounted. Detection signals from these sensors 25, 26 and 27 are put into a controller 28, and the motor 16 and the solenoid valve 22 are controlled based on these detection signals.

The control method during depressing of the brake pedal 7 by the controller 28 will be described below. As in the first embodiment, in the controller 28, a threshold $S_T$ for a predetermined position in the initial play area of the depressed amount S of the brake pedal 23 is preset. When the depressed amount S detected by the stroke sensor 26 reaches the threshold $S_T$, the pump 17 is driven by activating the motor 16. Further, the controller 28 detects the depressing speed of the brake pedal 23 from change in the detection signal of the stroke sensor 26, and demands to increase the motor driving force W so as to correspond to the depressing speed.

Also, in the controller 28, the terminal position SF of the initial play area of the brake pedal 23 is stored. When the depressed amount S reaches the initial play area terminal position SF, the solenoid valve 22 is closed and brake fluid is supplied from the pump 17, which has been activated beforehand, to the wheel cylinder 19, so that the brake hydraulic pressure PW rises. When the pedal depressed amount S exceeds the initial play area, the controller 28 increases or decreases the motor driving force W so as to correspond to the pedal depressing force F detected by the load sensor 25.

While the control results is not indicated, instead of the hydraulic pressure PM in the master cylinder in the graph of FIG. 2, which shows the control results of the first embodiment, the pedal depressing force F detected by the load sensor 25 rose simultaneously with the end of the initial play area of the depressed amount S. As in the first embodiment, the motor driving force W increased sharply, so that the brake hydraulic pressure increased quickly.

While in each of the embodiments, the stroke sensors for continuously detecting displacement are used for the detection of the threshold $S_T$ of the pedal depressed amount S and the initial position area terminal position SF, a switch sensor may be used which detects only the point at which the threshold $S_T$ or the initial play area terminal position SF is reached. For the detection of the initial play area terminal position SF, if the master cylinder is provided, it may be detected by the rise of its hydraulic pressure PM.

With the arrangement according to the present invention, the driver will not feel a delay in the effect of the brake. Also, it is possible to produce brake force quickly and accurately corresponding to the step-in of the brake pedal 7.

What is claimed is:

1. A method of controlling a vehicle hydraulic brake system, said brake system including a brake operating member having an initial play area, a brake operating force detecting means for detecting an operating force of said brake operating member produced when the brake operating amount of the brake operating member exceeds said initial play area, a hydraulic pressure source for producing brake hydraulic pressure in a wheel cylinder, a driving device for said hydraulic pressure source, a fluid passage for communicating said hydraulic pressure source with said wheel cylinder, and a relief passage communicating with said wheel cylinder through an on-off valve, said driving device for said hydraulic pressure source being actuated based on a detection signal from said brake operating force detecting means, said method comprising:

providing a brake operating amount detecting means for detecting the brake operating amount in said initial play area;

setting a threshold at a predetermined position in said initial play area; and activating said driving device for said hydraulic pressure source when said brake operating amount detecting means detects that said brake operating amount has reached said threshold, prior to said brake operating amount exceeding said initial play area.

2. The method as claimed in claim 1 wherein said brake system further comprises a master cylinder for producing hydraulic pressure corresponding to the operating force of said brake operating member, and a master cylinder passage through which said master cylinder and said wheel cylinder communicate with each other through an on-off valve, and wherein the hydraulic pressure produced in said master cylinder is transmitted to said wheel cylinder by selectively opening and closing said on-off valve in said master cylinder passage.

3. The method as claimed in claim 1 wherein said on-off valve in said relief passage is opened beforehand, and is closed when said brake operating amount detecting means or said brake operating force detecting means detects that the brake operating amount has reached the terminal position of said initial play area.

4. The method as claimed in claim 2 wherein said on-off valve in said master cylinder passage is opened beforehand, and is closed when said brake operating amount detecting means or said brake operating force detecting means detects that the brake operating amount has reached the terminal position of said initial play area.

5. The method as claimed in claim 1 wherein the operating speed of said brake operating member in the initial play area is detected by said brake operating amount detecting means, and the driving force of the driving device for said hydraulic pressure source which is activated beforehand is increased according to said operating speed.

6. The method as claimed in claim 2 wherein said on-off valve in said relief passage is opened beforehand, and is closed when said brake operating amount detecting means or said brake operating force detecting means detects that the brake operating amount has reached the terminal position of said initial play area.

7. The method as claimed in claim 2 wherein the operating speed of said brake operating member in the initial play area is detected by said brake operating amount detecting means, and the driving force of the driving device for said hydraulic pressure source which is activated beforehand is increased according to said operating speed.

8. The method as claimed in claim 3 wherein the operating speed of said brake operating member in the initial play area is detected by said brake operating amount detecting means, and the driving force of the driving device for said hydraulic pressure source which is activated beforehand is increased according to said operating speed.

9. The method as claimed in claim 4 wherein the operating speed of said brake operating member in the initial play area is detected by said brake operating amount detecting means, and the driving force of the driving device for said hydraulic pressure source which is activated beforehand is increased according to said operating speed.

10. The method as claimed in claim 6 wherein the operating speed of said brake operating member in the initial play area is detected by said brake operating amount detecting means, and the driving force of the driving device for said hydraulic pressure source which is activated beforehand is increased according to said operating speed.

11. A method of controlling a vehicle hydraulic brake system, said brake system including a brake operating member having an initial play area, a brake operating force detector that detects an operating force of said brake operating member produced when the brake operating amount of the brake operating member exceeds said initial play area, a hydraulic pressure source for producing brake hydraulic pressure in a wheel cylinder, a driving device for said hydraulic pressure source, a fluid passage for communicating said hydraulic pressure source with said wheel cylinder, and a relief passage communicating with said wheel cylinder through an on-off valve, said driving device for said hydraulic pressure source being actuated based on a detection signal from said brake operating force detector, said method comprising:

providing a brake operating amount detector that detects the brake operating amount in said initial play area;

setting a threshold at a predetermined position in said initial play area; and activating said driving device for said hydraulic pressure source when said brake operating amount detector detects that said brake operating amount has reached said threshold, prior to said brake operating amount exceeding said initial play area.

12. The method as claimed in claim 11, wherein said brake system further comprises a master cylinder for producing hydraulic pressure corresponding to the operating force of said brake operating member, and a master cylinder passage through which said master cylinder and said wheel cylinder communicate with each other through an on-off valve, said method further comprising transmitting the hydraulic pressure produced in said master cylinder to said wheel cylinder by selectively opening and closing said on-off valve in said master cylinder passage.

13. The method as claimed in claim 11, further comprising opening said on-off valve in said relief passage beforehand, and closing said on-off valve when said brake operating amount detector or said brake operating force detector detects that the brake operating amount has reached the terminal position of said initial play area.

14. The method as claimed in claim 12, further comprising opening said on-off valve in said master cylinder passage beforehand, and closing said on-off valve when said brake operating amount detector or said brake operating force detector detects that the brake operating amount has reached the terminal position of said initial play area.

15. The method as claimed in claim 11, further comprising detecting the operating speed of said brake operating member in the initial play area by said brake operating amount detector, and increasing the driving force of the driving device for said hydraulic pressure source which is activated beforehand according to said operating speed.

16. The method as claimed in claim 12, further comprising opening said on-off valve in said relief passage beforehand, and closing said on-off valve when said brake operating amount detector or said brake operating force detector detects that the brake operating amount has reached the terminal position of said initial play area.

17. The method as claimed in claim 12, further comprising detecting the operating speed of said brake operating member in the initial play area by said brake operating amount detector, and increasing the driving force of the driving device for said hydraulic pressure source which is activated beforehand according to said operating speed.

18. The method as claimed in claim 13, further comprising detecting the operating speed of said brake operating member in the initial play area by said brake operating amount detector, and increasing the driving force of the driving device for said hydraulic pressure source which is activated beforehand according to said operating speed.

19. The method as claimed in claim 14, further comprising detecting the operating speed of said brake operating member in the initial play area by said brake operating amount detector, and increasing the driving force of the driving device for said hydraulic pressure source which is activated beforehand according to said operating speed.

20. The method as claimed in claim 16, further comprising detecting the operating speed of said brake operating member in the initial play area by said brake operating amount detector, and increasing the driving force of the driving device for said hydraulic pressure source which is activated beforehand according to said operating speed.

* * * * *